(No Model.)
G. C. TWYMAN.
DOMESTIC BOILER.
No. 564,128. Patented July 14, 1896.
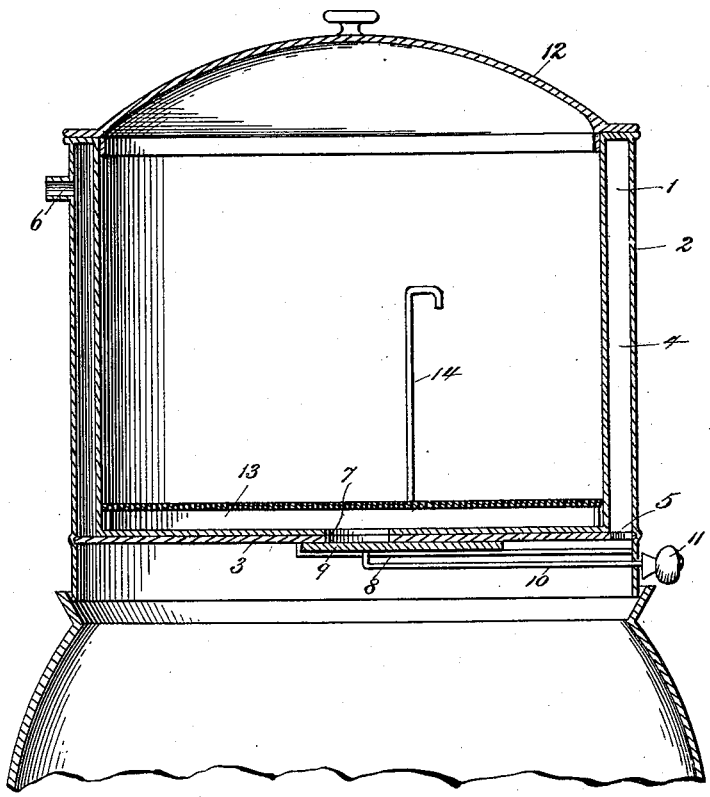
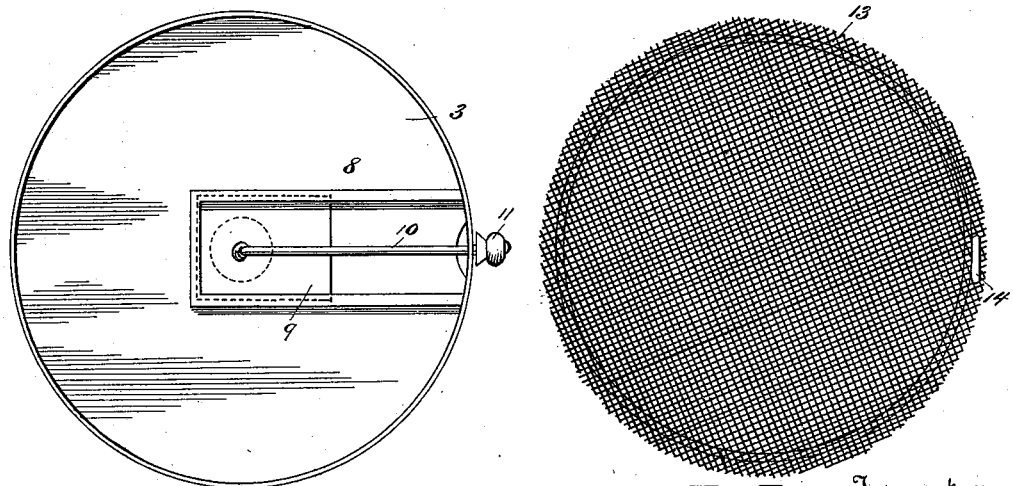
Witnesses
Thomas J. Keating
C. F. Duvall
Inventor
Goodloe C. Twyman,
By Duvall, Attorney

UNITED STATES PATENT OFFICE.

GOODLOE C. TWYMAN, OF VERSAILLES, KENTUCKY.

DOMESTIC BOILER.

SPECIFICATION forming part of Letters Patent No. 564,128, dated July 14, 1896.

Application filed November 26, 1895. Serial No. 570,168. (No model.)

*To all whom it may concern:*

Be it known that I, GOODLOE C. TWYMAN, a citizen of the United States, residing at Versailles, in the county of Woodford and State of Kentucky, have invented certain new and useful Improvements in Domestic Boilers; and I do hereby declare the following to be a full, clear, and exact description of the invention, such as will enable others skilled in the art to which it appertains to make and use the same.

My invention relates to improvements in domestic steamers or cookers, and the advantages in view are to produce a cheap and simple culinary utensil adapted to be supported over a pot or kettle and to be so adjusted as to subject the contents of the steamer or cooker to the direct or indirect influence and action of the steam as it rises from the pot or kettle.

Other objects and advantages of the invention will appear in the following description, and novel features thereof will be particularly pointed out in the claim.

Referring to the drawings, Figure 1 is a vertical transverse sectional view of a steamer or cooker constructed in accordance with my invention, the same being in position upon a pot or kettle. Fig. 2 is a bottom plan view of the steamer or cooker. Fig. 3 is a top plan view, in detail, of the removable tray that may be employed.

In the practice of my invention I employ an inner and an outer cylindrical vessel, 1 and 2, respectively, the latter having its wall extending below its bottom 3. The walls of the two cylinders are spaced apart producing an intermediate annular space 4, and are closed at their upper and lower ends with the exception of an inlet 5 with which the bottom 3 of the outer cylinder is provided. Near its upper end the outer cylinder is provided with a steam-outlet 6, which is preferably diametrically opposite the inlet 5.

The contacting bottoms of the two cylinders are provided with a central opening 7, with which the opening 5 is in radial alinement, and arranged at opposite sides of the opening 7, on the under side of the bottom 3, are parallel ways 8, in which is located for reciprocation a cut-off or plate 9. An operating-rod 10 is connected to the under side of the plate 9 and extends through the wall of the cylinder 2, beyond which point it is provided with a head 11.

It will be obvious that in Figs. 1 and 2 the position of the plate is such as to close the opening 7 and prevent steam from escaping through same into the inner cylinder, but by withdrawing the rod the plate may be brought to such position as will cause it to uncover the opening 7 and cover the opening 5.

A cap or cover 12 surmounts the cooker, and I may also arrange within the same a foraminous or perforated shelf 13, the same being elevated above the bottom of the inner cylinder by a surrounding flange and capable of being raised and lowered into position by a convenient handle 14 arising therefrom.

My invention is especially adapted for cooking meats and vegetables by the use of steam; also for softening bread, cakes, and pastry that have become stale. The operation of the device will be well understood and simply consists in introducing the articles to be cooked or softened into the inner cylinder, the support 13 elevating the same to such a height as to prevent possibility of burning and also affording a ready means for such introduction and removal. The rod 10 is withdrawn so as to uncover the opening 7 and permit steam to freely pass into the inner cylinder, where it becomes scattered by the perforated support and thoroughly permeates all the contents of said cylinder. When the meats or vegetables have become cooked in this manner, or the bread or pastry becomes softened, rod 10 is then pushed inward to the position shown in Figs. 1 and 2, so that the opening 7 is closed and opening 5 uncovered or opened. The steam is now excluded from the inner cylinder and can only pass out by first passing around the inner cylinder or into the steam-space 4, around which it entirely passes and is finally discharged through the opening 6. In this manner the contents of the cooker receive the drying action or heat of the steam without the moistening effect, and thus the moisture theretofore absorbed by the contents of the device is evaporated more or less and said contents dried out.

From the foregoing description, in connection with the accompanying drawings, it will be seen that I have provided an extremely useful, simple, and inexpensive cooker adapted to be applied to any ordinary pot or kettle, and to coöperate therewith in cooking vegetables or meats or freshening stale bread or pastry.

Having described my invention, what I claim is—

The herein-described domestic steamer or cooker, the same consisting of the inner and outer cylinders spaced apart to produce an intermediate steam-space closed at its upper and lower ends, the wall of the outer cylinder having the discharge 6 and the steam-inlet 5 opening into said space, and the bottoms of said cylinders having the central opening 7, the ways arranged at the opposite sides of the latter, the sliding cut-off plate arranged in the ways and adapted to close either of said openings, the operating-rod extending from the plate through the wall of the outer cylinder below the bottom of the latter, the perforated support arranged in the inner cylinder and the removable cover 12, substantially as specified.

In testimony whereof I affix my signature in presence of two witnesses.

GOODLOE C. TWYMAN.

Witnesses:
W. S. DUVALL,
FRANK D. BLACKISTONE.